July 16, 1968   D. WOLF   3,392,468

CONTAINER LID WITH IDENTIFYING MEANS

Filed March 21, 1966

INVENTOR.
DAVID WOLF
BY
Wolf, Greenfield & Hieken
ATTORNEYS

# United States Patent Office 3,392,468
Patented July 16, 1968

3,392,468
CONTAINER LID WITH IDENTIFYING MEANS
David Wolf, Newton, Mass., assignor to Sweetheart
Plastics, Inc., Wilmington, Mass., a corporation of
Delaware
Filed Mar. 21, 1966, Ser. No. 535,836
11 Claims. (Cl. 40—307)

ABSTRACT OF THE DISCLOSURE

A disposable, vacuum-formed, flexible, self-supporting, plastic lid especially designed for closing a disposable container. The lid is formed with four dimples which extend outwardly of the lid wall and which are adapted to be selectively inverted by finger pressure. Each dimple has an indicia associated with it, preferably in the form of an embossed letter on its surface that indicates the content of the container when that particular dimple is deflected.

---

This invention relates to container lids, and more particularly comprises a new and improved disposable lid for coffee cups.

One important object of this invention is to provide means in a coffee cup lid which enables a vender to conveniently indicate to a customer the contents of the cup on which the lid is placed. The take-out business at food counters for coffee and other beverages is very large, and there is some inconvenience imposed upon the counter man in indicating the contents of each cup of coffee sold in the take-out market. Many coffee cup lids carry the initials B, C, CS and BS for describing the condition of the coffee as either black, cream, cream and sugar, or black with sugar. These initials spaced about the lid are intended to be circled by the counter man, but he is required to take a pencil or other marking device in hand to actually circle the appropriate initial. When the counter man is particularly rushed during peak periods such as coffee breaks, he often either fails entirely to circle the appropriate initial to indicate the cup contents or circles the initial so hastely that he often makes mistakes.

Another important object of this invention is to provide means in a lid for indicating the cup contents, without increasing the cost of manufacture of such lids.

In accordance with the present invention a pencil or other marking device is not required to indicate the cup contents. Rather, the lid is provided with the appropriate initials to indicate what the contents may be and associated with each of the initials is a deformable portion which may be permanently deformed by a simple finger manipulation on the part of the counter man. This enables the counter man, without the assistance of a pencil or other marking device, to indicate to the customer the contents of the cup after it is closed with the lid. These and other objects and features of this invention along with its incident advantages, will be better understood and appreciated from the following detailed description of two embodiments thereof, selected for purposes of illustration and shown in the accompanying drawing, in which:

Figure 1:
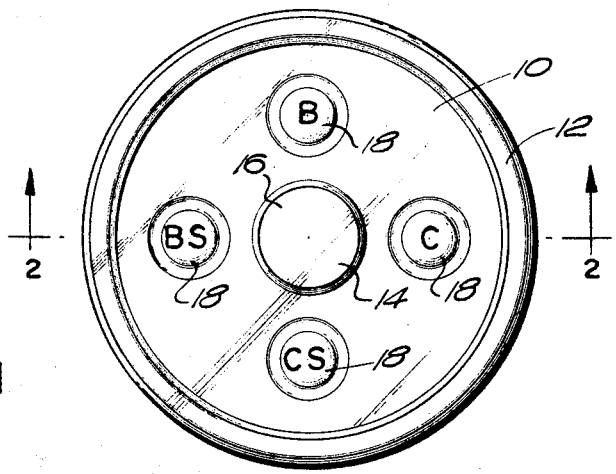
FIG. 1 is a plan view of a lid constructed in accordance with this invention.
Figure 2:
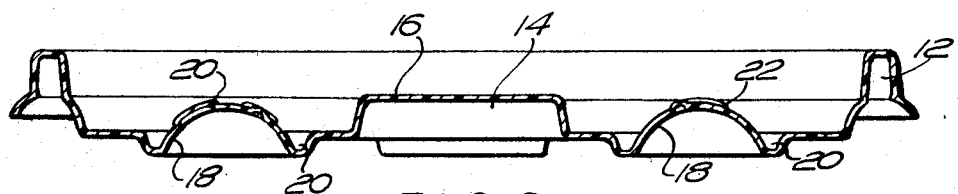
FIG. 2 is a cross-sectional view taken along the section line 2—2 in FIG. 1.

The lid shown in FIGS. 1 and 2 includes a circular cover wall or diaphragm 10 and a surrounding downwardly facing channel 12. The downwardly facing channel 12 is designed to receive the rim of a container upon which the cover is to be mounted. It is to be understood that the configuration of the channel 12 and the manner in which the lid seals about the mouth of the container form no part of the present invention, and the overall design of the lid shown is merely exemplary of the type of lids in which this invention may be embodied. In fact, the lid may have no channel or skirt about its periphery, but merely be designed to wedge within the cup mouth.

The invention is embodied in the indicating means incorporated into the lid and used to identify the contents of the container on which the lid is used. The lid shown minus the specific indicating means, is presently extensively used. The lid is generally of uniform thickness and is made of a thin, flexible, self-supporting plastic material. Typically, it is vacuum formed from a high impact, high heat polystyrene material and is .007 to .012 inch in thickness. In the embodiment shown, the circular wall 10 is provided with an inverted well 14 at its center ordinarily provided with a pin hole in its top wall 16 to allow steam to escape from the cup to prevent the lid from popping off the rim. Once again, the features of the inverted well 14, like the configuration of the inverted channel 12, form no part of this invention.

In FIGS. 1 and 2 four semispherical dimples 18 are shown formed in the circular wall 10 of the lid, and each is surrounded by a shallow channel 20. Formed in each of the dimples 18 at points where they may be easily read are initials B, C, CS and BS, identified at 22. Each of the initials is associated with a different dimple 18. In the prior art devices, these initials were formed in the circular wall of the lid but were not associated with anything comparable to the dimples 18 that function in the manner described below.

Figure 3:
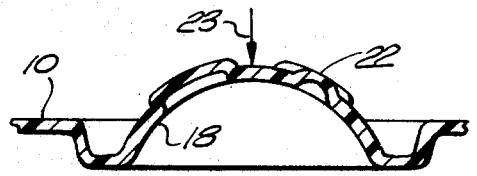
FIG. 3 is an enlarged fragmentary cross-sectional view of a portion of the lid shown in FIGS. 1 and 2.

The configuration of the dimples 18 is shown in detail in FIG. 3. Because the material from which the lid is made is flexible and deformable, and because of the configuration of the dimple with its surrounding channel, it may readily be permanently inverted to the shape shown in FIG. 4 merely by pressing it downwardly with a finger. When the counter man presses the dimple downward, the thin wall which makes up the dimple snaps through the central position and assumes the inverted position shown in FIG. 4 much like a toggle snaps through center when moving from one to another of its positions. Once having been inverted the dimple will not again invert to its normal position shown in FIG. 3 unless and until it is pushed to that position by a force applied to it.

Figure 4:
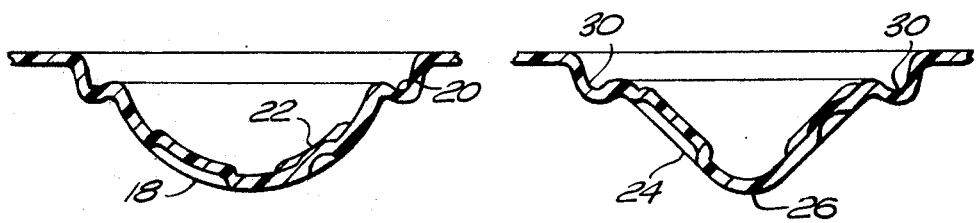
FIG. 4 is an enlarged fragmentary cross-sectional view of the same portion of the lid shown in FIG. 3, but illustrating the portion in a displaced position.

It is evident from the foregoing description that a counter man after filling a cup with coffee, which may be black or contain cream, or cream and sugar or merely have sugar added, may cap the cup with the lid shown and then merely press the appropriate dimple in the lid causing it to invert from the position shown in FIG. 3 to that shown in FIG. 4 as suggested by arrow 23 in FIG. 3. This will serve to indicate to the customer the contents of the cup without the customer removing the lid. It is also evident that the dimple once depressed will not accidently again invert to its original position. When the coffee enclosed in the cup and lid is transported to some remote location where it is to be consumed, the lid will still serve the function of indicating the cup contents.

It may be noted in FIGS. 1 and 2 that the several dimples provided in the lid are spaced radially inwardly from the channel 12 provided at the lid periphery. This spacing is provided so as to enable a cup to be placed on top of the lid and seat firmly on it when a number of filled and capped cups are stacked one upon the other. The dimples may also be sized so as not to interfere with the use of the lid as a coaster when it is inverted. The particular location of the dimples is unimportant so long as they may be conveniently inverted by the counter man and do not interfere with the nesting of a plurality of lids, one upon the other, or the stacking of a cup on the lid in the manner alluded to above.

Figure 5:
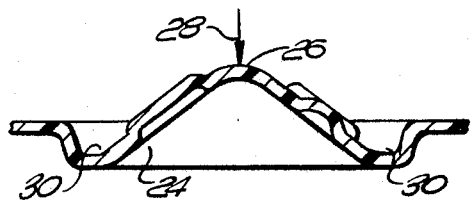
FIG. 5 is an enlarged fragmentary cross-sectional view similar to FIG. 3 and showing another embodiment of this invention.
Figure 6:
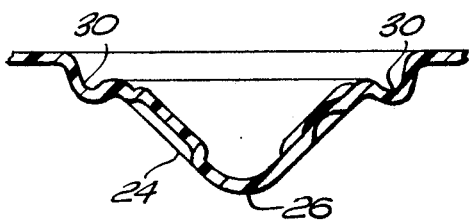
FIG. 6 is an enlarged fragmentary cross-sectional view of the part shown in FIG. 5 but showing the portion in a displaced position.

The embodiment of FIGS. 5 and 6 differs only slightly from that illustrated in FIGS. 1-4. The difference lies only in the specific configuration of the dimples. While the dimples 18 in the embodiment of FIGS. 1-4 are shown to be generally dish-shaped, the dimple 24 in the embodiment of FIGS. 5 and 6 is cone-shaped. However, it is evident that the dimple may be inverted from the position shown in FIG. 5 to that shown in FIG. 6 merely by applying a downwardly directing force to the apex 26 as suggested by arrow 28. To facilitate the permanent deformation of the dimple, a shallow channel 30 is provided about the cone-shaped dimple 24.

From the foregoing description it will be appreciated that the lid of the present invention enables a counter man without the aid of a pencil or other marking device, but rather by a simple finger manipulation, to indicate the contents of a cup capped by the lid. This convenient means of indicating the cup contents will in fact encourage the use of the indicating means even during rush periods because it enables the counter man to indicate the cup contents without seriously impairing his ability to dispenses coffee to customers rapidly.

Those skilled in the art will appreciate that modifications may be made of this invention without departing from its spirit. Therefore, it is not intended to limit the scope of this invention to the embodiments illustrated and described. Rather it is intended that the scope of this invention be determined by the appended claims and their equivalents.

What is claimed is:

1. A disposable lid, which lid is made of a thin deformable, flexible, self-supporting material for a container intended to carry a variety of contents, comprising:
    a top wall for closing the container,
    at least one deflectable dimple formed in the top wall as an integral part thereof,
    and indicia associated with the deflectable dimple for indicating a characteristic of the container contents.

2. A disposable lid as defined in claim 1 further characterized by:
    a plurality of dimples in the top wall which extends outwarly therefrom and which may be selectively inverted by finger pressure and a plurality of indicia, each associated with a different one of said dimples.

3. A disposable lid as defined in claim 2 further characterized by:
    said lid comprising a vacuum-formed plastic with said dimples, all extending upwardly from the top wall when in a nondeflected position.

4. A disposable lid as defined in claim 2 further characterized by:
    said indicia being vacuum formed on the surface of said dimples.

5. A disposable lid as defined in claim 2 further characterized by:
    said lid being made of a thin formable plastic material, and a channel surrounding the dimple facilitating inversion thereof.

6. A disposable lid as defined in claim 3 further characterized by:
    said lid being made of thin formable plastic material, each of said dimples being dish-shaped.

7. A disposable lid as defined in claim 3 further characterized by:
    said lid being made of thin formable plastic material, each of said dimples being cone-shaped.

8. A disposable lid as set forth in claim 1 wherein said wall has a thickness in the order of magnitude of .007 to .012 inch.

9. A disposable lid as set forth in claim 8 wherein said dimple has a diameter at its base which is greater than the maximum height of said dimple.

10. A disposable lid as set forth in claim 9 wherein said dimple is formed with sidewalls inclined from said top wall at an acute angle.

11. A disposable lid as set forth in claim 1 wherein said material comprises a vacuum-formed plastic having a thickness in the order of .007 to .012 inch, and further including:
    an annular channel continuous with the periphery of said top wall and adapted to engage said container,
    at least three dimples in the top wall extending upwardly therefrom and which may be selectively inverted by finger pressure,
    said dimples each having a diameter at its base which is greater than the maximum height of said dimple and with the sidewalls of said dimple inclined from said top wall at an acute angle, and
    a plurality of indicia, with one each associated with a different one of said dimples designed to indicate, when deflected, the contents of said container.

References Cited

UNITED STATES PATENTS

| | | | |
|---|---|---|---|
| 2,201,524 | 5/1940 | Esty | 40—307 |
| 2,962,829 | 12/1960 | Gaare | 40—324 |
| 3,276,573 | 10/1966 | Kaufman et al. | 206—42 |

EUGENE R. CAPOZIO, *Primary Examiner.*

W. GRIEB, *Assistant Examiner.*